J. KERCHER.
VEHICLE WHEEL.
APPLICATION FILED MAY 16, 1921.
1,428,241.
Patented Sept. 5, 1922.
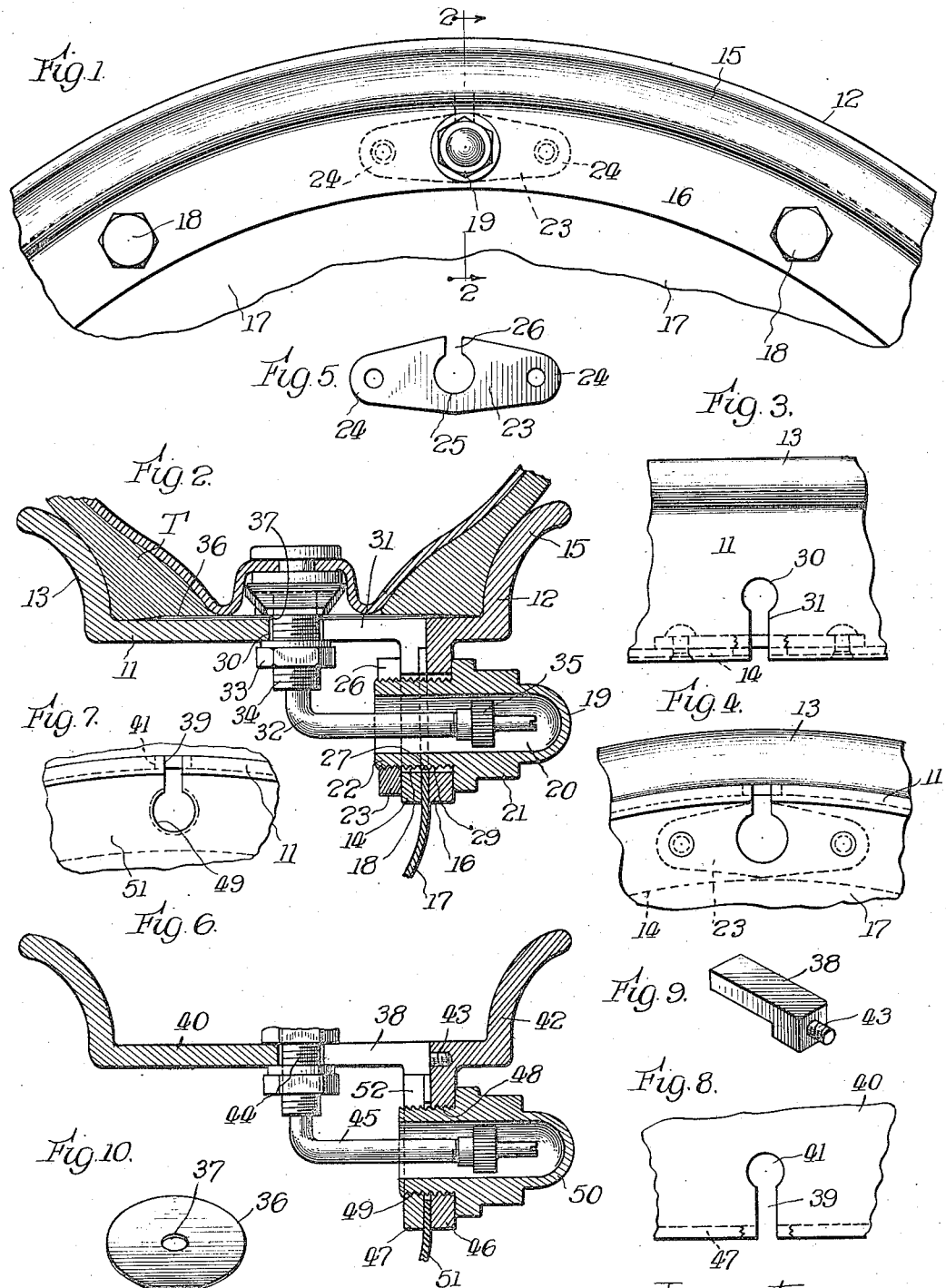
Witness:
A. J. Sauser
Inventor:
John Kercher,
By Harvey L. Hanson
Attorney.

Patented Sept. 5, 1922.

1,428,241

UNITED STATES PATENT OFFICE.

JOHN KERCHER, OF CHICAGO, ILLINOIS.

VEHICLE WHEEL.

Application filed May 16, 1921. Serial No. 470,139.

*To all whom it may concern:*

Be it known that I, JOHN KERCHER, a citizen of the United States, and a resident of Chicago, in the county of Cook, State of Illinois, have invented certain new and useful Improvements in Vehicle Wheels, of which the following is a specification.

The invention relates to improvements in vehicle wheels, and particularly to wheels of the disc type in which a metallic disc extends from the hub to the rim in lieu of spokes, either wood or wire, and which are provided with a rim adapted to have a pneumatic tire demountably provided thereon.

In the usual construction of wheels of this type, the valve for the pneumatic tire is arranged substantially intermediate the side edges of the rim and in rear of the outside face of the disc. This position of the valve or valve casing makes it inconvenient to attach a pump to the valve casing to inflate the tire when the wheel is attached to the axle of a vehicle, such as an automobile, in which the springs, fenders and other portions of the machine augment the difficulties in reaching the valve stem to inflate the tire, to apply air pressure gauge thereto, or to deflate, or partially deflate the tire.

The invention has as its prime object the provision of a structure whereby the valve casing will be readily accessible to permit the attachment of the pump, the air pressure gauge, the deflating means, or to perform any other requirement, yet will permit the tire and valve casing to be readily mounted and to be readily removed, or demounted, from the rim of the wheel, when this is found necessary or desirable.

In some wheels of the disc type the rim is composed of two sections which cooperate to removably secure the tire to the wheel. One of these sections is removably secured to the other to allow the tire to be mounted upon the rim and removed therefrom. The disc extends from the hub of the wheel to the rim and is permanently secured to one of these rim sections.

In the particular disc wheel illustrated in the accompanying drawings, one rim section is of greater width than the other and the periphery of the disc is secured adjacent the outermost edge of the larger rim section. The disc is dished inwardly from this edge to its connection with the hub, this latter connection being in substantial alignment with the center of the rim formed by the two rim sections. The aperture provided in one of the rim sections to allow the stem or valve casing of the tire to be passed through the rim is arranged substantially midway between the side edges of the completed rim and it is therefore arranged in rear of the disc. This position of the valve casing interferes with its accessibility which is a source of annoyance which the invention is designed to eliminate. To obviate this disadvantage the valve stem of the tire is bent outwardly and one end thereof protrudes beyond the disc of the wheel. The aperture which permits the valve casing and tire to be arranged with respect to the wheel is constructed so that the tire and valve stem may also be readily removed from the wheel should this at any time be found necessary, or desirable.

The rim portions of the wheel embodying the invention are removably secured together by bolts and nuts which are properly spaced from each other adjacent the periphery of the disc. The place of one of these bolts is taken by a bolt which provides a housing for the end of the valve casing or stem. When this bolt is removed from the disc and the rim, it exposes the end of the valve casing and permits the connection thereto of the inflating apparatus, the air pressure guage, deflating means, or other device. This last mentioned bolt is of a slightly different construction and configuration from the remaining bolts so that it may readily be distinguished from the other bolts, and thus enables the user of the vehicle, or other person, to readily locate the valve stem, to connect the inflating apparatus, the gauge or other device, or to remove the tire from the wheel. This bolt, with its associated construction, referred to herein, and the bolts and nuts spaced adjacent the periphery of the disc, serve to secure the rim sections together and to the disc to produce the wheel.

The invention will be explained in conjunction with the accompanying drawings in which various structures of which the invention is susceptible are illustrated, it being obvious that other arrangements may be employed without departing from the spirit of the appended claims forming a part hereof.

In the drawings—

Figure 1 is a partial side elevation of a wheel of the disc type having the invention applied thereto, Figure 2 is an enlarged section taken on line 2—2 of Figure 1, showing a portion of a pneumatic tire applied thereto, Figure 3 is a top plan view of a portion of the rim shown in Fig. 2.

Figure 4 is a side elevation of that portion of the rim shown in Figure 3.

Figure 5 is a detail elevation of a portion of the structure employed in the construction shown in Figures 1, 2, 3 and 4.

Figure 6 is a sectional view similar to Figure 2, showing a modified arrangement which may be resorted to, Figure 7 is a side elevation of one portion of the rim shown in Figure 6, Figure 8 is a top plan view of a portion of the rim shown in Figure 6, Figure 9 is a perspective detail of an element employed in the structure illustrated in Figure 6, and Figure 10 is a detail perspective view of a disc, or shim, which may be employed in connection with the structures shown in Figures 2 and 6.

The rim sections of the wheel are shown at 11 and 12. The section 11 is provided with an upwardly extending tire engaging flange 13 and an inwardly extending annular flange 14. The rim section or flange 12 is detachable and removable from the rim section 11 and is provided with an upwardly extending flange 15 similar to the flange 13 of the rim portion 11 and also has an inwardly extending annular flange 16 similar to the flange 14. The outer periphery of the wheel disc 17 is arranged between these inwardly extending annular flanges 14 and 16 of the respective rim sections 11 and 12. The disc 17 and rim sections 11 and 12 are secured together by means of a plurality of bolts and nuts 18, 18 and the bolt generally designated 19, the latter being of a different configuration than the bolts 18, 18, so that it may be readily distinguished from the other bolts which serve only to secure the rim flange to the wheel. The bolt 19 is provided with a recessed portion 20 to receive the end of the valve stem and cap and provides a housing therefor, and is also provided with side 21 and the threaded end 22. This threaded end engages the plate 23 clearly shown in Figure 5. The plate 23 is preferably shaped to produce the side extensions 24, 24, which are used in permanently securing the plate 23 to the inner face of the inwardly projecting annular flange 14, as by riveting, or in any other suitable manner. This plate 23 is apertured at 25 and this aperture is threaded to receive the threaded portion 22 of the bolt 19. The plate 23 is further provided with the upwardly extending slotted aperture 26 which communicates with the threaded aperture 25 and extends therefrom to the edge of the plate and provides a passage to and from the threaded opening 25. The purpose of this construction will be presently explained.

The disc section 17 and inwardly extending annular flanges 14 and 16 are provided with apertures 27, 28 and 29, respectively, which permit the threaded portion 22 of the bolt 19 to be passed through the flanges 14 and 16 and the disc 17 into engagement with the threaded portion of the aperture 25 of the plate 23. Thus it is manifest that this bolt 19 secures these portions together at this point and may be unscrewed to permit the separation of the rim sections 11 and 12 when desired. The aperture 28 provided in the flange 14 communicates with a circular aperture 30 provided in the rim section 11. The apertures 28 and 30 are connected together by the slot 31 which extends from the circular opening 30 to the opening 28 in the annular inturned flange 14. The circular aperture 30 is provided to accommodate a certain portion of the valve stem when it is positioned for use. The opening 28 and the slot 31 allow the valve stem to be arranged upon one side of the rim section and to be removed from this position.

The valve stem or casing 32 is provided with a clamping nut 33, which is threaded upon the enlarged portion 34 of the stem, which is connected to the inner tube of the tire T. The valve casing extending from the portion 34 is bent laterally towards the outside of the wheel and terminates beyond the outside face of the disc 17 and has its end arranged within the recess 20 of the bolt 19, which forms a housing therefor. The extremity of the valve stem may be provided with a valve cap 35 of the usual construction. Thus when access to the valve stem 32 is desired, the bolt 19 will be disconnected from its association with the plate 23. This exposes the end of the valve stem without interfering with the connections between the rim sections 11 and 12 and readily permits the connection of various devices to the end of the stem and eliminates the inconvenience heretofore referred to.

When it is desired to change the tire, all of the bolts 18, 18 and the bolt 19 will be unthreaded from their connections with the inwardly extending annular flanges 14 and 16 of the rim sections 11 and 12 and the plate 23. This permits the removal of the rim section 12 from the disc 17 and the rim section 11. The nut 33 may be removed from the wheel by removing it from its connection with the portion 34 of the valve stem and passing it along the stem, or casing, 32 through the apertures 25, 28 and 27 provided in the plate 23, the annular flange 14 and the disc 17 respectively. The nut may then be passed over the cap 35. By removing the bolts 18, 18 and 19 and the annular rim section 12, the apertures 25, 28 and 27 are exposed. This allows the stem 32 (as shown in Figure 2) to be lifted from its position in the apertures 25, 28 and 27 through the slot 31 and the apertures 25, 26, 28 and 27 provided respectively in the rim section 11, the plate 23, the annular flange portion 14, and the disc 17 of the wheel.

When a tire is to be replaced upon the rim 11 the laterally extending portion of the stem 32 is passed down (as shown in Figure 2) through the opening 31 in the rim into the apertures 26, 25, 28 and 27 provided in the plate 23, the inwardly extending annular flange 14 and the disc 17 respectively. This brings the threaded portion 34 of the stem into relation with the circular opening 30 and by passing the nut 33 over the outer end of the valve stem, through the apertures 27, 28 and 25, and into engagement with the threaded portion 34, and threading it thereon, the stem is secured to the rim section 11. The annular member 12 is then placed in position with respect to the rim portion 11 and is secured with respect thereto by the bolts and nuts 18, 18, which completes the rim and secures the removable rim section 12 to the disc. The bolt 19 is then passed through the apertures 29, 27 and 28 in the annular inwardly extending flange portions 14 and 16 and the disc 17, over the end of the valve stem or casing and into engagement with the threaded aperture 25.

Provision is also made for centering the valve stem 32 with relation to the apertures such as 25, 28, 27 and 29 of the plate, disc and rim sections. This structure also provides a means for closing the aperture 31 to prevent dirt and other foreign matter from finding its way between the tube and the casing of the tire. The means employed in the structure shown in Figure 2 is clearly shown in Figure 10 and includes one or more preferably metallic shims 36 which are provided with a central aperture 37 of sufficient dimension to accommodate the threaded portion 34 of the valve stem or casing 32. A plurality of these shims may be used, one arranged above the other, to shift the valve stem with relation to the center of the openings referred to and are of sufficient diameter to extend across the entire length of the opening 31 thereby completely closing it.

By employing a plate, such as shown in Figure 5, and securing it permanently to the rim flange, or some other stationary part of the rim structure adjacent the openings in the flange and disc, the liability of its becoming lost or dropping away from the wheel when the bolt 19 is unscrewed is eliminated. This arrangement also obviates the necessity of holding this portion or plate 23 in position to be at all times engaged by the bolt 19.

The structure shown in Figure 6 is practically identical with that shown in Figure 2, differing only in that the use of the plate, such as 23, is eliminated and also in that it employs a plug 38 which is arranged in the slot 39 of the rim section 40 to prevent dirt and other foreign matter from entering between the tire and inner tube. The slot 39 connects with the enlarged opening 41 for the reception of one end of the valve stem. In this structure the plug 38 is secured to the removable rim section 42 by means of the pin 43 which connects the plug and this rim section together so that when the rim section 42 is removed from the rim section 40 the plug 38 will be removed with it. The plug 38 terminates adjacent the threaded portion 44 of the valve casing 45 and holds this portion against any great relative movement with relation to the rim. In this structure the inwardly extending annular flanges 46 and 47 of the rim sections 42 and 40 respectively are provided with apertures 48 and 49 respectively, the aperture 48 being screw threaded to afford a connection with the bolt 50 to secure the rim sections and the disc 51 together. The aperture 49 of the flange 47 is also threaded and communicates with the aperture 52 provided in the rim section 40. This structure is similar to that disclosed in Figure 2, except as herein stated, and the valve casing is arranged with respect to the rim sections and removed therefrom in a manner similar to that explained in connection with the association and removal of the tire and stem illustrated and described in connection with the structure shown in Figures 1 and 2.

Having thus described the invention what I desire to secure and obtain by Letters Patent is:

1. In a vehicle wheel, the combination of a rim, a disc extending inwardly from the rim, said disc having a slot permitting the removal of a valve casing from said rim and disc.

2. In a vehicle wheel, the combination of a rim, said rim including a removable flange, a disc extending inwardly from said rim, a tire valve casing extending through the rim and terminating at one side of said disc, said rim having a slot permitting the removal of the valve casing from said rim.

3. In a vehicle wheel, the combination of a rim, a disc extending inwardly from said rim, a tire having a valve casing, an aperture in the rim and disc through which the valve casing extends, a removable flange cooperating to hold the tire to the rim, said aperture in the rim and disc permitting the removal of the tire from the rim upon the removal of the flange from the rim.

4. In a vehicle wheel, the combination of a rim, a disc extending inwardly from the rim, a removable flange arranged adjacent the rim, a plurality of bolts for securing said rim and flange together, slots in the rim, flange and disc through which a valve casing may be passed, said valve casing terminating at one side of said disc.

5. In a vehicle wheel, the combination of a rim, a disc extending inwardly from the rim, a laterally extending slot in the rim and a slot in the disc arranged adjacent the slot in the rim; said slots permitting a valve casing to be passed through the rim and arranged upon the inner side of the rim, and at one side of the disc.

6. In a vehicle wheel, the combination of a rim, a disc extending inwardly from the rim, a removable flange arranged adjacent the rim, a bolt for securing said flange and rim together, an aperture in the disc and flange for the bolt, a tire valve casing, said rim having an aperture to permit the valve casing to be arranged upon one side of the rim, said valve casing being passed through the aperture in the rim and into the aperture for the bolt, said bolt forming a housing for the end of the valve casing.

7. In a vehicle wheel, the combination of a rim, a disc extending inwardly from the rim, a tire valve casing, an aperture in the rim through which the valve casing may be passed, an aperture in the disc, the aperture in the disc permitting the valve casing to be arranged therein, and a removable member arranged in the aperture provided in the rim.

8. In a vehicle wheel, the combination of a rim, a disc extending inwardly from the rim, a removable flange arranged adjacent the rim, a tire valve casing, said casing being removably arranged with respect to the rim by means of the aperture provided in the rim, and a member carried by the removable flange for insertion in the aperture provided in the rim.

9. In a vehicle wheel, the combination of a rim, a disc extending inwardly from the rim, a removable flange arranged adjacent the rim, a bolt for securing said flange and rim together, a tire valve casing, an aperture provided in the rim whereby said valve casing may be arranged at one side of the rim, the end of the valve casing terminating within the bolt for securing the rim and flange together.

10. In a vehicle wheel, the combination of a rim having an inwardly projecting flange, an aperture provided in the rim and flange, a removable annular member arranged adjacent the rim, an aperture provided in said annular member, a tire valve casing, said valve casing being permitted to be passed through the aperture in the rim and flange and to extend through the aperture in the removable annular member, said aperture in the rim and flange permitting the removal of the valve casing from the rim, upon the removal of the annular member.

11. In a vehicle wheel, the combination of a rim, a disc extending inwardly from the rim, a plurality of bolts for securing said rim and disc together, and apertures arranged in angular relation to each other in the rim and disc for the reception of a tire valve casing, one of said bolts providing a cap for the end of the valve casing.

In witness whereof, I hereunto subscribe my name this 13th day of May, A. D. 1921.

JOHN KERCHER.